US012080039B2

(12) United States Patent
Rakshit et al.

(10) Patent No.: US 12,080,039 B2
(45) Date of Patent: Sep. 3, 2024

(54) CONTEXTUAL POLICY-BASED COMPUTER VISION CONTROL

(71) Applicant: KYNDRYL, INC., New York, NY (US)

(72) Inventors: Sarbajit K. Rakshit, Kolkata (IN); Pritpal S. Arora, Bangalore (IN); Laxmikantha Sai Nanduru, R K Puram Post (IN)

(73) Assignee: Kyndryl, Inc., New York, NY (US)

( * ) Notice: Subject to any disclaimer, the term of this patent is extended or adjusted under 35 U.S.C. 154(b) by 504 days.

(21) Appl. No.: 17/341,602

(22) Filed: Jun. 8, 2021

(65) Prior Publication Data

US 2022/0391625 A1    Dec. 8, 2022

(51) Int. Cl.
| | |
|---|---|
| *G06N 20/00* | (2019.01) |
| *G06T 1/00* | (2006.01) |
| *G06V 10/20* | (2022.01) |
| *G06V 20/52* | (2022.01) |
| *H04N 23/61* | (2023.01) |
| *H04N 23/90* | (2023.01) |

(52) U.S. Cl.
CPC ........... *G06V 10/255* (2022.01); *G06N 20/00* (2019.01); *G06T 1/0014* (2013.01); *G06V 20/52* (2022.01); *H04N 23/61* (2023.01); *H04N 23/90* (2023.01)

(58) Field of Classification Search
CPC ...... G06V 10/255; G06V 20/52; G06N 20/00; H04N 23/61; H04N 23/90; G06T 1/0014
See application file for complete search history.

(56) References Cited

U.S. PATENT DOCUMENTS

| | | | |
|---|---|---|---|
| 6,727,938 B1 | 4/2004 | Randall | |
| 8,238,879 B2 | 8/2012 | Singh | |
| 8,457,466 B1 * | 6/2013 | Sharma | G06F 16/783 386/224 |

(Continued)

FOREIGN PATENT DOCUMENTS

| | | |
|---|---|---|
| KR | 1008934191 B1 | 4/2009 |
| KR | 1012992431 B1 | 8/2013 |
| KR | 102141179 B1 | 8/2020 |

OTHER PUBLICATIONS

"Computer vision", Wikipedia, This page was last edited on Apr. 7, 2021, 15 pages.

(Continued)

*Primary Examiner* — Shefali D Goradia
*Assistant Examiner* — D J Dhooge
(74) *Attorney, Agent, or Firm* — CANTOR COLBURN LLP; Erik Swanson

(57) ABSTRACT

A tool for providing contextual policy-based computer vision control. The tool identifies one or more camera devices in an environment. The tool determines a plurality of vision areas in a field of view within the environment. The tool determines one or more contextual policies for the plurality of vision areas in the field of view. The tool determines one or more vision augmentations for the plurality of vision areas based, at least in part, on an aggregate computer vision capability of the one or more camera devices in the environment and the one or more contextual policies for the plurality of vision areas in the field of view. The tool applies the one or more vision augmentations to at least one of the one or more camera devices in the environment.

20 Claims, 3 Drawing Sheets

(56) References Cited

U.S. PATENT DOCUMENTS

| | | | |
|---|---|---|---|
| 8,660,534 | B2 | 2/2014 | Singh |
| 8,706,453 | B2 | 4/2014 | Braun |
| 8,917,909 | B2 * | 12/2014 | Kritt ............... G06T 11/00 |
| | | | 382/103 |
| 9,041,798 | B1 | 5/2015 | Yerkes |
| 9,210,312 | B2 | 12/2015 | Sablak |
| 9,872,088 | B2 | 1/2018 | Fadell |
| 10,250,871 | B2 * | 4/2019 | Ciurea ............... G06T 7/80 |
| 2008/0297589 | A1 | 12/2008 | Kurtz |
| 2018/0365514 | A1 * | 12/2018 | Kosik ............... G01S 5/04 |
| 2020/0079412 | A1 * | 3/2020 | Ramanathan ........ G06Q 20/322 |

OTHER PUBLICATIONS

"Computer Vision: What it is and why it matters", SAS, downloaded from the internet on Apr. 14, 2021, <https://www.sas.com/en_us/insights/analytics/computer-vision.html>, 4 pages.

"Types of Vision Problems", downloaded from the internet on Apr. 14, 2021, 5 pages, <https://www.health.ny.gov/diseases/conditions/vision_and_eye_health/ty . . . >.

"Understanding Camera Specs: What's the Most Important for You?", downloaded from the internet on Apr. 14, 2021, 14 pages, <https://www.photographytalk.com/beginner-photography-tips/understand . . . >.

Moynihan, et al., "Camera specs explained", PCWorld, Oct. 10, 2012, 6 pages, <https://www.techhive.com/article/2011477/camera-specs-explained.html>.

* cited by examiner

CONTEXTUAL POLICY-BASED COMPUTER VISION CONTROL

BACKGROUND OF THE INVENTION

The present invention relates generally to computer vision, and more particularly to contextual policy-based computer vision control.

Computer vision is an interdisciplinary scientific field that deals with how computer devices can gain high-level understanding from digital images or videos. From the perspective of engineering, it seeks to understand and automate tasks that the human visual system can do. Computer vision is a field of artificial intelligence that trains computer devices to interpret and understand the visual world. Using digital images from cameras and videos, and deep learning models, computer devices can accurately identify and classify objects, then react to what they have analyzed. Generic Industry Applications include electronic surveillance, fire detection and alerting, gate control, flood relief operations, traffic control and management, law enforcement, disease detection and control, attendance systems, testing and examination centers, special purpose three-dimensional imaging, mineral resources detection, and many more.

SUMMARY

Aspects of an embodiment of the present invention disclose a method, computer program product, and computer system for providing contextual policy-based computer vision control. The method includes identifying, by one or more computer processors, one or more camera devices in an environment. The method includes determining, by the one or more computer processors, a plurality of vision areas in a field of view within the environment. The method includes determining, by the one or more computer processors, one or more contextual policies for the plurality of vision areas in the field of view. The method includes determining, by the one or more computer processors, one or more vision augmentations for the plurality of vision areas based, at least in part, on an aggregate computer vision capability of the one or more camera devices in the environment and the one or more contextual policies for the plurality of vision areas in the field of view. The method includes applying, by the one or more computer processors, the one or more vision augmentations to at least one of the one or more camera devices in the environment.

DETAILED DESCRIPTION

Embodiments of the present invention recognize that in order to ensure that computer vision captures footage that meets certain requirements, there is a need to control the computer vision in such a way that only permitted imagery is captured by a camera system, or specific portions of prohibited imagery be blocked in certain situations. Embodiments of the present invention recognize that computer vision capability of a computing system needs to be dynamically controlled and managed based on a defined policy.

Embodiments of the present invention provide the capability to dynamically control camera functionality on one or more client devices based, at least in part, on one or more pre-defined policies, contextual policies, and contextual situations, where controlling camera functionality includes augmenting computer vision capabilities in real-time and retroactively. Embodiments of the present invention provide the capability to analyze internet of things (IoT) feeds from a specific location and surrounding areas to determine contextual data, and based, at least in part, on the contextual data, enable augmented computer vision capabilities for one or more client devices in conformance with one or more pre-defined policies. Embodiments of the present invention provide the capability to enable various types of computer vision capabilities in a specific location based on contextual analysis and one or more pre-defined policies.

Embodiments of the present invention provide an inventive approach that has advantages over other known solutions.

Implementation of such embodiments may take a variety of forms, and exemplary implementation details are discussed subsequently with reference to the Figures.

Figure 1:
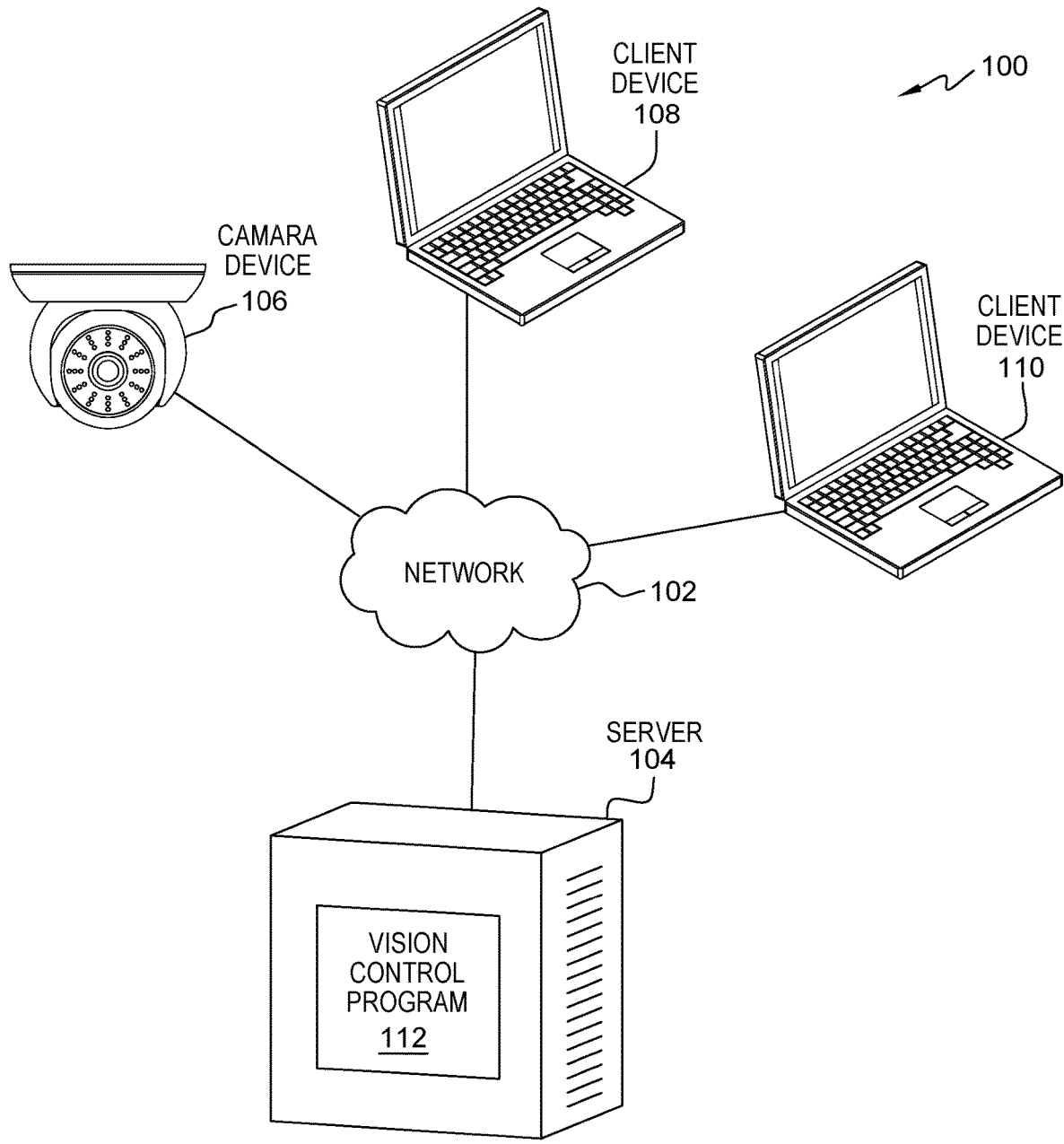
FIG. 1 illustrates a data processing environment, generally designated 100, in accordance with an embodiment of the present invention.

Referring now to various embodiments of the invention in more detail, FIG. 1 is a functional block diagram that illustrates a data processing environment, generally designated 100, suitable for providing contextual policy-based computer vision control, in accordance with at least one embodiment of the invention. The present invention will now be described in detail with reference to the Figures. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. FIG. 1 includes network 102, server 104, one or more client devices, such as camera device 106, client device 108, client device 110, and vision control program 112.

In one embodiment, network 102 is the Internet representing a worldwide collection of networks and gateways that use TCP/IP protocols to communicate with one another. Network 102 may include wire cables, wireless communication links, fiber optic cables, routers, switches and/or firewalls. Server 104, camera device 106, client device 108, and client device 110 are interconnected by network 102. Network 102 can be any combination of connections and protocols capable of supporting communications between server 104, camera device 106, client device 108, client device 110, and vision control program 112. Network 102 can be, for example, a telecommunications network, a local area network (LAN), a virtual local area network (VLAN), a wide area network (WAN), such as the Internet, or a combination of the three, and can include wired, wireless, or fiber optic connections. Network 102 may include one or more wired and/or wireless networks that are capable of receiving and transmitting data, voice, and/or video signals, including multimedia signals that include voice, data, and video information. In general, network 102 may be any combination of connections and protocols that will support communications between server 104, camera device 106, client device 108, client device 110, and vision control program 112, as well as other computing devices (not shown) within data processing environment 100. FIG. 1 is intended as an example and not as an architectural limitation for the different embodiments.

In one embodiment, server 104 may be, for example, a server computer system such as a management server, a web server, or any other electronic device or computing system capable of sending and receiving data. In another embodiment, server 104 may be a data center, consisting of a collection of networks and servers providing an IT service, such as virtual servers and applications deployed on virtual servers, to an external party. In another embodiment, server 104 represents a "cloud" of computers interconnected by one or more networks, where server 104 is a computing system utilizing clustered computers and components to act as a single pool of seamless resources when accessed through network 102. This is a common implementation for data centers in addition to cloud computing applications. In one embodiment, server 104 includes vision control program 112 for providing contextual policy-based computer vision control on one or more client devices, such as illustrated by camera device 106, client device 108, and client device 110, respectively.

In one embodiment, vision control program 112 operates on a central server, such as server 104, and can be utilized by one or more client devices, such as camera device 106, client device 108, and client device 110, via an application download from the central server or a third-party application store and executed on the one or more client devices. In another embodiment, vision control program 112 may be software, downloaded from a central server, such as server 104, and installed on one or more client devices, such as camera device 106, client device 108, and client device 110. In yet another embodiment, vision control program 112 may be utilized as a software service provided by a third-party cloud service provider (not shown). In yet another embodiment, vision control program 112 may include one or more components (not shown), such as add-ons, plug-ins, and agent programs, etc., installed on one or more client devices, such as camera device 106, client device 108, and client device 110, to provide contextual policy-based computer vision control. In one embodiment, vision control program 112 can be an add-on feature to a third-party service that provides a user the ability to dynamically control and manage computer vision on one or more client devices, such as camera device 106, client device 108, and client device 110, based on one or more pre-defined policies. In one embodiment, vision control program 112 can be fully integrated with a third-party video imaging service. In some embodiments, vision control program 112 may be partially integrated or separate from a third-party video imaging service. In one embodiment, vision control program 112 may be an application, downloaded from an application store or third-party provider, capable of being used in conjunction with a third-party video imaging service on one or more client devices, such as camera device 106, client device 108, and client device 110, to dynamically control and manage computer vision based on one or more pre-defined policies.

In one embodiment, vision control program 112 can be utilized by a client device, such as camera device 106, client device 108, and client device 110, to enable contextual policy-based computer vision control on the one or more devices. In one embodiment, vision control program 112 provides the capability to dynamically control and manage computer vision utilizing one or more contextual policies. In one embodiment, vision control program 112 provides the capability to dynamically control camera functionality on one or more client devices based, at least in part, on one or more pre-defined policies, contextual policies, and contextual situations, where controlling camera functionality includes augmenting computer vision capabilities in real-time and retroactively. In one embodiment, vision control program 112 provides the capability to analyze internet of things (IoT) feeds from a specific location and surrounding areas to determine contextual data, and based, at least in part, on the contextual data, enable augmented computer vision capabilities for one or more client devices, such camera device 106, client device 108, and client device 110. In one embodiment, vision control program 112 provides the capability to control camera movement, lens magnification, etc., in a specific location based, at least in part, on contextual data related to various situations occurring at the specific location. In one embodiment, where a mobile device with camera functionality, such as client device 108, is moving (e.g., wearable device on a person, camera device integrated into a vehicle, etc.), vision control program 112 provides the capability to determine a relative position of the mobile device, apply various policies for vision control based, at least in part, on contextual situations found at the relative position, and dynamically augment camera functionality (i.e., movement, angle of view, depth, vision capabilities, etc.) based on the various policies. In one embodiment, vision control program 112 provides the capability to determine one or more levels of trust by utilizing a ledger containing various types of vision capabilities leveraged in a plurality of locations and contextual situations that align with one or more policies.

In one embodiment, vision control program 112 may be configured to access various data sources, such as a database or repository (not shown), that may include personal data, content, policy data, contextual data, image data, video data, or any other information a user wishes not to be processed. Personal data includes personally identifying information or sensitive personal information as well as user location information, such as tracking or geolocation information. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal data. Vision control program 112 enables the authorized and secure processing of personal data. In one embodiment, vision control program 112 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. In one embodiment, vision control program 112 provides information regarding personal data and the nature (e.g., type, scope, purpose, duration, etc.) of the processing. In one embodiment, vision control program 112 provides a user with copies of stored personal data. In one embodiment, vision control program 112 allows the correction or completion of incorrect or incomplete personal data. In one embodiment, vision control program 112 allows the immediate deletion of personal data.

In one embodiment, camera device 106, client device 108, and client device 110 are clients to server 104 and may be, for example, a desktop computer, a laptop computer, a tablet computer, a personal digital assistant (PDA), a smart phone, a thin client, or any other electronic device or computing system having camera functionality (e.g., computer vision) and being capable of communicating with server 104 through network 102. For example, client device 108 may be a mobile device, such as a smart phone, capable of connecting to a network, such as network 102, to access the Internet, utilize remote video imaging system, and utilize one or more software applications. In another example, client device 108 and client device 110 may be a computing device utilized by a third-party video imaging service (e.g., video security system, video conferencing system, etc.). In one embodiment, camera device 106, client device 108, and client device 110 may be any suitable type of client device capable of executing one or more applications utilizing a mobile operating system or a computer operating system. In one embodiment, client device 108 and client device 110 may include a user interface (not shown) for providing a user with the capability to interact with vision control program 112, a third-party video imaging service via a client device, such as client device 108, and a remote video camera, such as camera device 106. A user interface refers to the information (such as graphic, text, and sound) a program presents to a user and the control sequences the user employs to control the program. There are many types of user interfaces. In one embodiment, the user interface may be a graphical user interface (GUI). A GUI is a type of user interface that allows users to interact with electronic devices, such as a keyboard and mouse, through graphical icons and visual indicators, such as secondary notations, as opposed to text-based interfaces, typed command labels, or text navigation. In computers, GUIs were introduced in reaction to the perceived steep learning curve of command-line interfaces, which required commands to be typed on the keyboard. The actions in GUIs are often performed through direct manipulation of the graphics elements.

In one embodiment, camera device 106, client device 108, and client device 110 may be any wearable electronic devices, including wearable electronic devices affixed to eyeglasses and sunglasses, helmets, wristwatches, clothing, wigs, tattoos, embedded devices, and the like, capable of sending, receiving, and processing data. In one embodiment, camera device 106, client device 108, and client device 110 may be any wearable computer capable of supporting contextual policy-based computer vision control across one or more client devices. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In general, camera device 106, client device 108, and client device 110 each represent one or more programmable electronic devices or combination of programmable electronic devices capable of executing machine readable program instructions and communicating with other computing devices (not shown) within data processing environment 100 via a network, such as network 102.

In one embodiment, camera device 106 may be a closed feed digital video camera in a public environment capable of monitoring customer movement patterns and density in one or more locations of the retail environment (i.e., retail space, sales floor, shopping center, showroom, etc.). In one embodiment, camera device 106 is a digital video camera capable of capturing images of customers in a retail environment, and transmitting the images to a server computer, such as server 104, to be utilized by a software program, such as vision control program 112. In one embodiment, camera device 106 may be a digital video camera coupled with or interconnected with one or more sensors, such as motion sensors, radio frequency identification sensors (RFID), thermal sensors, etc., which can be used to gather contextual information and video images. In one embodiment, camera device 106 may be an infrared video camera coupled or interconnected with one or more sensors, such as motion sensors, radio frequency identification sensors (RFID), thermal sensors, etc., which can be used to gather contextual information and video images. In one embodiment, camera device 106 provides the capability to capture digital photographs, video images, infrared images, etc., and augment, in real-time and retroactively, the images with a plurality of vision capabilities (i.e., characteristics) including, but not limited to, clear vision of a field of view, blurred vision of an area in the field of view during a specific situation taking place within the field of view, simulated crossed eye vision in a specific area in the field of view, macular degeneration during a specific situation in a field of view, glaucoma vision during a specific situation in a field of view, cataract vision in a specific area in a field of view, diabetic retinopathy vision in a specific area of a field of view, pixel density vision in a specific situation taking place within a field of view, panoramic vision, deep magnification of a specific area in a field of view, and any combination of one or more of the above vision capabilities. In one embodiment, camera device 106 may be any type of digital camera capable, including, but not limited to, visual digital camera, thermal camera, laser camera, acoustic camera, or any combination of cameras known in the art.

Figure 2:
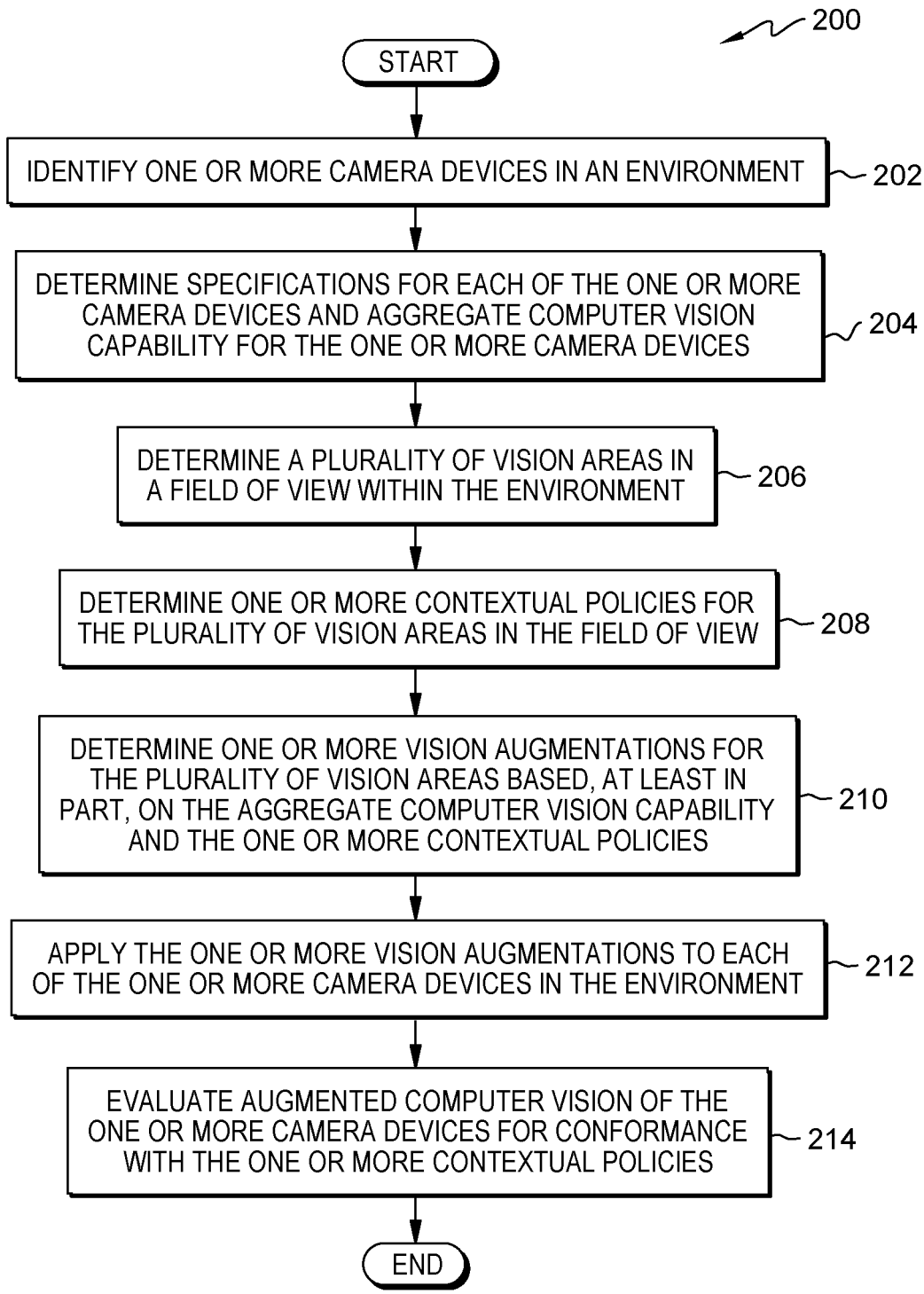
FIG. 2 is a flowchart depicting operational steps of a vision control program, such as the vision control program of FIG. 1, generally designated 200, for providing contextual policy-based computer vision control, in accordance with an embodiment of the present invention.

FIG. 2 is a flowchart depicting operational steps of a vision control program, such as vision control program 112, generally designated 200, for providing contextual policy-based computer vision control, in accordance with an embodiment of the present invention.

Vision control program 112 identifies one or more camera devices in an environment (202). In one embodiment, vision control program 112 identifies one or more camera devices in an environment by determining a type of camera equipment within an environment (e.g., a geographic location, a business, a structure, a computing system, etc.). In one embodiment, vision control program 112 assigns a unique identifier (ID) to each type of camera equipment with the environment. In one embodiment, the one or more camera devices, such as camera device 106, client device 108, and client device 110, may be any type of digital camera capable, including, but not limited to, visual digital camera, thermal camera, laser camera, acoustic camera, or any combination of cameras known in the art. In one embodiment, the one or more camera devices in the environment may be fully integrated, partially integrated, or separate from a client device, such as client device 108 and client device 110.

For example, vision control program 112 may identify one or more camera devices, such as camera device 106, in an environment, such as a retail space comprising a video surveillance system throughout. In this example, vision control program 112 uniquely identifies each of the one or more camera devices within the environment, such as "camera 1", "register camera", "break room camera", "parking lot camera", and "dressing room camera" and assigns a unique ID to each device.

Vision control program 112 determines specifications for each of the one or more camera devices and aggregates computer vision capability for the one or more camera devices (204). In one embodiment, based, at least in part, on the type of the one or more camera devices, vision control program 112 determines a type of computer vision capability that each camera is capable of capturing. For example, different cameras have various specifications (e.g., sensors and sensor types, megapixel count, resolution capabilities, lens zoom, image stabilization, exposure settings, aspect ratio and image area, low light performance specifications, shutter speeds, autofocus points, etc.), and these various specifications can provide different types of computer vision capabilities. In one embodiment, vision control program 112 aggregates the computer vision capability for each of the one or more camera devices in the environment to identify a total range of computer vision capabilities by any combination of the one or more camera devices.

Vision control program 112 determines a plurality of vision areas in a field of view within the environment (206). In one embodiment, vision control program 112 determines a plurality of vision areas in a field of view within the environment by accessing a pivoting system attached to the one or more camera devices, and utilizing the pivoting system, remotely moving the one or more cameras through a full range of motion to gather image data from an entire field of view. In one embodiment, vision control program 112 may create one or more virtual sections and subsections to define the plurality of vision areas with the field of view. In one embodiment, the field of view may be viewed from a single camera. In another embodiment, the field of view may include multiple views from a plurality of camera devices in the environment. In one embodiment, the plurality of vision areas in the field of view can be configured based, at least in part, on a dimensional value (length, width, height, etc.) of the one or more virtual sections, a specific location within the field of view, specific objects within the field of view, or any other conceivable metric for defining visual subsets within the field of view. In one embodiment, each of the plurality of vision areas in the field of view may be accessed by, include, or be assigned to one or more camera devices, and as such, computer vision capabilities in each of the plurality of vision areas will vary based on the specifications of each of the one or more camera devices. In one embodiment, vision control program 112 captures coverage of a field of view in the environment based, at least in part, on movement of the one or more camera devices within the environment. For example, where the one or more camera devices are fixed to a wall within an environment, vision control program 112 captures coverage of the field of view utilizing movement of each of the one or more camera devices on a pivoting system. In another example, where the one or more camera devices are wearable electronic devices on a person, vision control program 112 captures the field of view utilizing the movement of the person throughout the environment. In one embodiment, vision control program 112 determines the plurality of vision areas within the field of view to provide for different types of vision control to be applied within each of the plurality of vision areas across the field of view. In one embodiment, vision control program 112 may define the plurality of vision areas based on proximity to a person, location, or object. In one embodiment, vision control program 112 may utilize geofencing to define the plurality of vision areas.

Vision control program 112 determines one or more contextual policies for the plurality of vision areas in the field of view (208). In one embodiment, vision control program 112 determines one or more contextual policies for the plurality of vision areas in the field of view utilizing internet of things (IoT) feed analysis within the environment, ultrasound imaging, thermal imaging, and positioning of images. In one embodiment, the one or more contextual policies define what type of imaging is permitted in each of the plurality of vision areas within a field of view. In one embodiment, the one or more contextual policies define what type of imaging is prohibited in each of the plurality of vision areas within a field of view. In one embodiment, the one or more contextual polices can vary and automatically be adjusted based on a type and amount of contextual data being gathered. In one embodiment, vision control program 112 identifies various contextual situations in real-time within a field of view and selects one or more contextual policies for a plurality of vision areas within the field of view. In one embodiment, the one or more contextual policies may be pre-determined policies that align with various regulatory and legal requirements. In another embodiment, the one or more contextual policies may be dynamic policies based on a user configurable set of rules. In one embodiment, vision control program 112 determines one or more contextual policies that can be applied to one or more camera devices to manage computer vision gathered from the plurality of vision areas within the field of view. In one embodiment, vision control program 112 may determine a unique contextual policy for each of the one or more camera devices, and accordingly, as each of the one or more camera devices can be managed individually, each of the plurality of vision areas within a field of view can be managed individually. For example, vision control program 112 may define a field of view into a subset of four vision areas, and each of the four vision areas is assigned a different contextual policy dictating what types of image gathering is allowed and/or prohibited in each respective vision area.

Vision control program 112 determines one or more vision augmentations for the plurality of vision areas based, at least in part, on the aggregate computer vision capability and the one or more contextual policies (210). In one embodiment, vision control program 112 references the aggregate computer vision capabilities for the one or more camera devices and determines one or more combinations of the one or more cameras to effectuate the one or more vision augmentations. In one embodiment, the one or more vision augmentations may include, but not limited to, blurred vision of an area in the field of view during a specific situation taking place within the field of view, simulated crossed eye vision in a specific area in the field of view, macular degeneration during a specific situation in a field of view, glaucoma vision during a specific situation in a field of view, cataract vision in a specific area in a field of view, diabetic retinopathy vision in a specific area of a field of view, pixel density vision in a specific situation taking place within a field of view, panoramic vision, deep magnification of a specific area in a field of view, color blindness, and any combination of one or more of the above computer vision capabilities mimicking vision impairment. In one embodiment, vision control program 112 compares one or more vision augmentations supported by the aggregate computer vision capabilities provided by the one or more camera devices to the one or more contextual policies assigned to each of the plurality of vision areas. In one embodiment, vision control program 112 determines one or more vision augmentations that satisfy the one or more contextual policies assigned to each of the plurality of vision areas. For example, where a vision area is assigned a contextual policy that states certain objects are prohibited from being viewed, vision control program 112 may determine a simulated blurred vision augmentation within a pre-defined proximity to the certain objects satisfies the contextual policy and selects this vision augmentation for application to the one or more camera devices viewing the vision area. In some embodiments, vision control program 112 may select other devices, such as thermal imaging and acoustic imaging, in combination with the one or more camera devices to support the one or more vision augmentation in the plurality of vision areas. In one embodiment, vision control program 112 provides the capability to manipulate mechanical and electrical capabilities of the one or more camera devices and various image processing engines to effectuate the vision augmentations.

Vision control program 112 applies the one or more vision augmentations to each of the one or more camera devices in the environment (212). In one embodiment, vision control program 112 applies the one or more vision augmentations to each of the one or more camera devices, or combination of devices, to manage image gathering and recording in each of the plurality of vision areas within the field of view. In one embodiment, vision control program 112 applies the one or more vision augmentations automatically based on contextual situations in real-time to ensure the computer vision complies with the one or more contextual policies set for each of the plurality of vision areas within the field of view. In one embodiment, vision control program 112 utilizes an in-line artificial intelligence (AI) video processing module to further process image data where mechanical and electrical controls of the one or more camera devices do not effectuate a vision augmentation that satisfies the one or more contextual policies assigned to each of the plurality of vision areas in the field of view. In one embodiment, vision control program 112 applies the one or more vision augmentations by determining whether an object in at least one of the plurality of vision areas in the field of view violates at least one of the one or more contextual policies. Where vision control program 112 determines that an object violates at least one of the one or more contextual policies, vision control program 112 applies at least one of the one or more vision augmentations to one or more of the camera devices assigned to the vision area within the field of view where the object is present. In one embodiment, vision control program 112 may apply the one or more vision augmentations to an entire vision area within a field of view. In another embodiment, vision control program 112 may apply the one or more vision augmentations in a targeted approach, such as applying the one or more vision augmentations in such a way as to obscure an object violating one or more contextual policies, but retain a remainder of a surrounding vision area within the field of view.

Vision control program 112 evaluates augmented computer vision of the one or more camera devices for conformance with the one or more contextual policies (214). In one embodiment, vision control program 112 evaluates augmented computer vision of the one or more camera devices for conformance with the one or more contextual policies by recording image data gathered from the one or more camera devices augmented with the one or more visual augmentations. In one embodiment, vision control program 112 collects contextual data related to the plurality of vision areas, the field of view, and contextual situations taking place in each of the plurality of vision areas and stores the contextual data in a ledger along with augmented computer vision data. In one embodiment, vision control program 112 generates the ledger to compile data used for analyzing contextual policy adherence. In one embodiment, vision control program 112 can assign various weighed tags to items listed in the ledger to facilitate future audit actions, conflict resolution, and policy management related to the one or more contextual policies and vision augmentations.

In another embodiment, responsive to a determination that the augmented computer vision is in compliance with the one or more contextual policies assigned to each of the plurality of vision areas in the field of view, vision control program 112 presents imaging data (i.e., camera footage) to an end user within a pre-determined time delay. In one embodiment, vision control program 112 may present the augmented computer vision directly to an end user in real-time.

Figure 3:
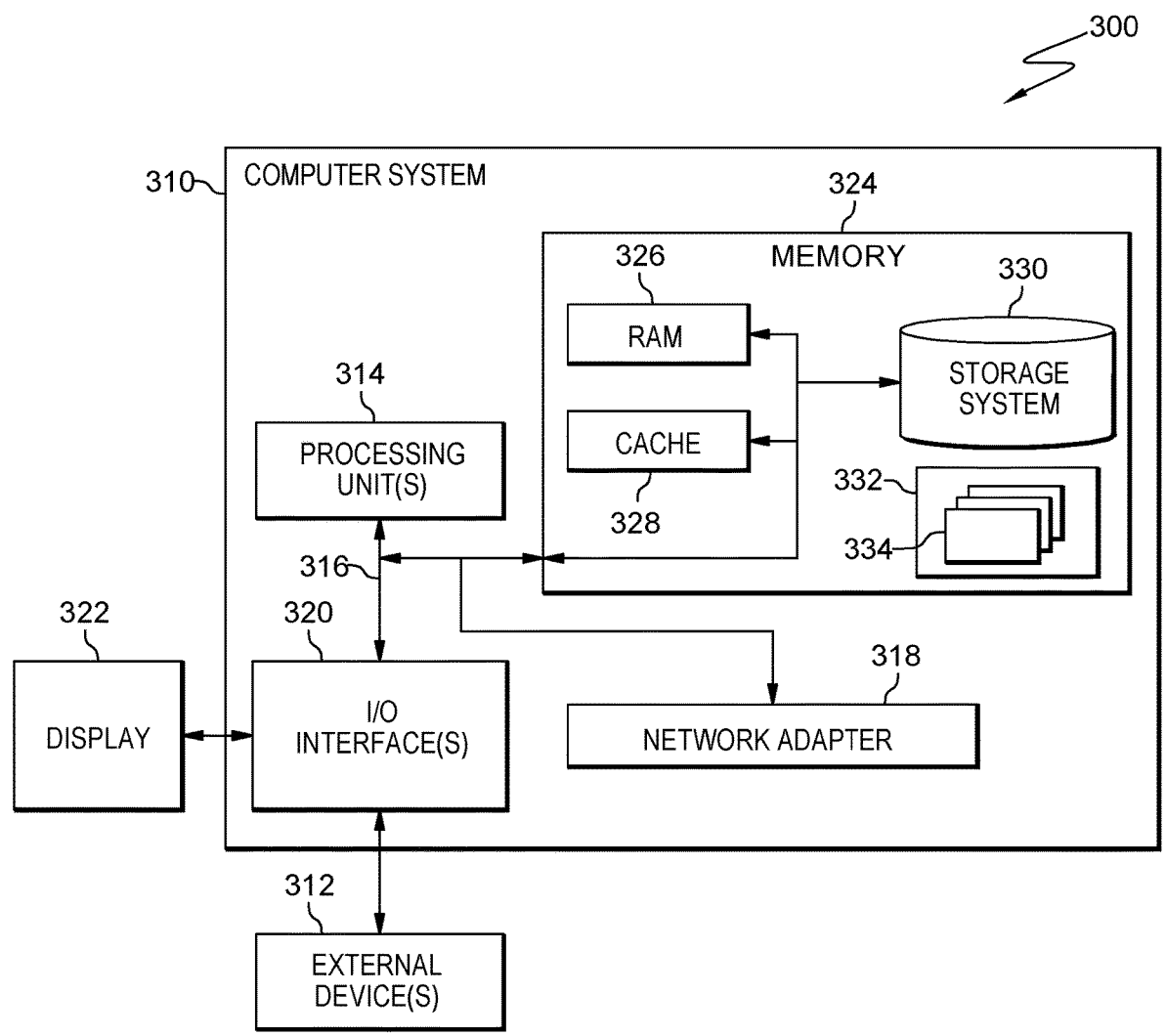
FIG. 3 is a block diagram depicting components of a data processing environment, such as the server of FIG. 1, generally designated 300, in accordance with an embodiment of the present invention.

FIG. 3 is a block diagram depicting components of a data processing environment, such as server 104 of data processing environment 100, generally designated 300, in accordance with an embodiment of the present invention. It should be appreciated that FIG. 3 provides only an illustration of one implementation and does not imply any limitations with regard to the environments in that different embodiments may be implemented. Many modifications to the depicted environment may be made.

In the illustrative embodiment, server 104 in data processing environment 100 is shown in the form of a general-purpose computing device, such as computer system 310. The components of computer system 310 may include, but are not limited to, one or more processors or processing unit(s) 314, memory 324 and bus 316 that couples various system components including memory 324 to processing unit(s) 314.

Bus 316 represents one or more of any of several types of bus structures, including a memory bus or memory controller, a peripheral bus, an accelerated graphics port and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus and Peripheral Component Interconnect (PCI) bus.

Computer system 310 typically includes a variety of computer system readable media. Such media may be any available media that is accessible by computer system 310 and it includes both volatile and non-volatile media, removable and non-removable media.

Memory 324 can include computer system readable media in the form of volatile memory, such as random access memory (RAM) 326 and/or cache memory 328. Computer system 310 may further include other removable/non-removable, volatile/non-volatile computer system storage media. By way of example only, storage system 330 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk") and an optical disk drive for reading from or writing to a removable, non-volatile optical disk, such as a CD-ROM, DVD-ROM or other optical media can be provided. In such instances, each can be connected to bus 316 by one or more data media interfaces. As will be further depicted and described below, memory 324 may include at least one computer program product having a set (e.g., at least one) of program modules that are configured to carry out the functions of embodiments of the invention.

Program/utility 332, having one or more sets of program modules 334, may be stored in memory 324 by way of example and not limitation, as well as an operating system, one or more application programs, other program modules and program data. Each of the operating systems, one or more application programs, other program modules and program data or some combination thereof, may include an implementation of a networking environment. Program modules 334 generally carry out the functions and/or methodologies of embodiments of the invention as described herein. Computer system 310 may also communicate with one or more external device(s) 312, such as a keyboard, a pointing device, a display 322, etc. or one or more devices that enable a user to interact with computer system 310 and any devices (e.g., network card, modem, etc.) that enable computer system 310 to communicate with one or more other computing devices. Such communication can occur via Input/Output (I/O) interface(s) 320. Still yet, computer system 310 can communicate with one or more networks, such as a local area network (LAN), a general wide area network (WAN) and/or a public network (e.g., the Internet) via network adapter 318. As depicted, network adapter 318 communicates with the other components of computer system 310 via bus 316. It should be understood that although not shown, other hardware and software components, such as microcode, device drivers, redundant processing units, external disk drive arrays, RAID systems, tape drives and data archival storage systems may be used in conjunction with computer system 310.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable) or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems) and computer program products according to embodiments of the invention. It will be understood that each block of the flowchart illustrations and/or block diagrams and combinations of blocks in the flowchart illustrations and/or block diagrams, can be implemented by computer readable program instructions.

These computer readable program instructions may be provided to a processor of a general purpose computer, a special purpose computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus or other device to cause a series of operational steps to be performed on the computer, other programmable apparatus or other device to produce a computer implemented process, such that the instructions which execute on the computer, other programmable apparatus or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace or to enable others of ordinary skill in the art to understand the embodiments disclosed herein.

The terminology used herein is for the purpose of describing particular embodiments only and is not intended to be limiting of the invention. It should be appreciated that any particular nomenclature herein is used merely for convenience and thus, the invention should not be limited to use solely in any specific function identified and/or implied by such nomenclature. Furthermore, as used herein, the singular forms of "a", "an", and "the" are intended to include the plural forms as well, unless the context clearly indicates otherwise.

What is claimed is:

1. A method, comprising:
   identifying, by one or more computer processors, a plurality of camera devices in an environment;
   remotely moving, by the one or more computer processors, the plurality of camera devices through a range of motion to gather data from a field of view of the plurality of camera devices;
   determining, by the one or more computer processors, a plurality of vision areas in the field of view within the environment, wherein the plurality of vision areas are virtual subsections of the field of view;
   determining, by the one or more computer processors, one or more contextual policies for the plurality of vision areas in the field of view;
   determining, by the one or more computer processors, one or more vision augmentations for the plurality of vision areas based on an aggregate computer vision capability of the plurality of camera devices in the environment and the one or more contextual policies for the plurality of vision areas in the field of view; and
   applying, by the one or more computer processors, the one or more vision augmentations to at least one of the plurality of camera devices to control the one or more cameras to comply with the one or more contextual policies.

2. The method of claim 1, wherein the applying the one or more vision augmentations further comprises:
   determining, by the one or more computer processors, whether an object in at least one of the plurality of vision areas in the field of view violates at least one of the one or more contextual policies; and
   responsive to a determination that the object violates at least one of the one or more contextual policies, applying, by the one or more computer processors, at least one of the one or more vision augmentations to at least one of the plurality of camera devices in the environment.

3. The method of claim 1, further comprising:
   determining, by the one or more computer processors, a plurality of specifications for each of the plurality of camera devices in the environment, wherein the plurality of specifications indicate a type of computer vision capability for each of the plurality of camera devices; and
   aggregating, by the one or more computer processors, the type of computer vision capability for each of the plurality of camera devices in the environment to identify the aggregate computer vision capability of the plurality of camera devices, wherein the aggregate computer vision capability is a total range of computer vision capabilities for any combination of the plurality of camera devices in the environment.

4. The method of claim 1, wherein the determining a plurality of vision areas in a field of view further comprises:
   creating, by the one or more computer processors, one or more virtual sections to define the plurality of vision areas in the field of view;
   configuring, by the one or more computer processors, the plurality of vision areas in the field of view based on a dimensional length of the one or more virtual sections; and
   assigning, by the one or more computer processors, at least one of the plurality of camera devices to each of the plurality of vision areas in the field of view.

5. The method of claim 1, wherein the determining one or more contextual policies for the plurality of vision areas in the field of view further comprises:
   identifying, by the one or more computer processors, a plurality of contextual situations in real-time utilizing the plurality of camera devices in the environment;
   selecting, by the one or more computer processors, one or more contextual policies based on the plurality of contextual situations, wherein the one or more contextual policies define a type of imaging that is prohibited in each of the plurality of vision areas within the field of view; and
   assigning, by the one or more computer processors, at least one of the one or more contextual policies to at least one of the plurality of vision areas in the field of view.

6. The method of claim 1, wherein the determining the one or more vision augmentations for the plurality of vision areas further comprises:
   comparing, by the one or more computer processors, the one or more vision augmentations supported by the aggregate computer vision capability of the plurality of camera devices in the environment to the one or more contextual policies assigned to each of the plurality of vision areas in the field of view; and
   determining, by the one or more computer processors, at least one of the one or more vision augmentations supported by the aggregate computer vision capability of the plurality of camera devices that satisfies the one or more contextual policies assigned to each of the plurality of vision areas in the field of view.

7. The method of claim 1, further comprising:
   evaluating, by the one or more computer processors, an augmented computer vision of the plurality of camera devices in the environment for conformance with the one or more contextual policies.

8. A computer program product comprising a computer-readable storage medium storing program instructions comprising:
  program instructions to identify a plurality of camera devices in an environment;
  program instructions to remotely move the plurality of camera devices through a range of motion to gather data from a field of view of the plurality of camera devices;
  program instructions to determine a plurality of vision areas in the field of view within the environment, wherein the plurality of vision areas are virtual subsections of the field of view;
  program instructions to determine one or more contextual policies for the plurality of vision areas in the field of view;
  program instructions to determine one or more vision augmentations for the plurality of vision areas based on an aggregate computer vision capability of the plurality of camera devices in the environment and the one or more contextual policies for the plurality of vision areas in the field of view; and
  program instructions to apply the one or more vision augmentations to at least one of the plurality of camera devices to control the one or more cameras to comply with the one or more contextual policies.

9. The computer program product of claim 8, wherein the program instructions to apply the one or more vision augmentations further comprise:
  program instructions to determine whether an object in at least one of the plurality of vision areas in the field of view violates at least one of the one or more contextual policies; and
  program instructions to, responsive to a determination that the object violates at least one of the one or more contextual policies, apply at least one of the one or more vision augmentations to at least one of the plurality of camera devices in the environment.

10. The computer program product of claim 8, further comprising:
  program instructions to determine a plurality of specifications for each of the plurality of camera devices in the environment, wherein the plurality of specifications indicate a type of computer vision capability for each of the plurality of camera devices; and
  program instructions to aggregate the type of computer vision capability for each of the plurality of camera devices in the environment to identify the aggregate computer vision capability of the plurality of camera devices, wherein the aggregate computer vision capability is a total range of computer vision capabilities for any combination of the plurality of camera devices in the environment.

11. The computer program product of claim 8, wherein the program instructions to determine a plurality of vision areas in a field of view further comprise:
  program instructions to create one or more virtual sections to define the plurality of vision areas in the field of view;
  program instructions to configure the plurality of vision areas in the field of view based on a dimensional length of the one or more virtual sections; and
  program instructions to assign at least one of the plurality of camera devices to each of the plurality of vision areas in the field of view.

12. The computer program product of claim 8, wherein the program instructions to determine one or more contextual policies for the plurality of vision areas in the field of view further comprise:
  program instructions to identify a plurality of contextual situations in real-time utilizing the plurality of camera devices in the environment;
  program instructions to select one or more contextual policies based on the plurality of contextual situations, wherein the one or more contextual policies define a type of imaging that is prohibited in each of the plurality of vision areas within the field of view; and
  program instructions to assign at least one of the one or more contextual policies to at least one of the plurality of vision areas in the field of view.

13. The computer program product of claim 8, wherein the program instructions to determine the one or more vision augmentations for the plurality of vision areas further comprise:
  program instructions to compare the one or more vision augmentations supported by the aggregate computer vision capability of the plurality of camera devices in the environment to the one or more contextual policies assigned to each of the plurality of vision areas in the field of view; and
  program instructions to determine at least one of the one or more vision augmentations supported by the aggregate computer vision capability of the plurality of camera devices that satisfies the one or more contextual policies assigned to each of the plurality of vision areas in the field of view.

14. The computer program product of claim 8, further comprising:
  program instructions to evaluate augmented computer vision of the plurality of camera devices in the environment for conformance with the one or more contextual policies.

15. A computer system, comprising:
  a memory storing instructions; and
  a processor that, when executing the instructions, is configured to:
    identify a plurality of camera devices in an environment;
    remotely move the plurality of camera devices through a range of motion to gather data from a field of view of the plurality of camera devices;
    determine a plurality of vision areas in the field of view within the environment, wherein the plurality of vision areas are virtual subsections of the field of view;
    determine one or more contextual policies for the plurality of vision areas in the field of view;
    determine one or more vision augmentations for the plurality of vision areas based, at least in part, on an aggregate computer vision capability of the plurality of camera devices in the environment and the one or more contextual policies for the plurality of vision areas in the field of view; and
    apply the one or more vision augmentations to at least one of the plurality of camera devices to control the one or more cameras to comply with the one or more contextual policies.

16. The computer system of claim 15, wherein the processor is further configured to:
  determine whether an object in at least one of the plurality of vision areas in the field of view violates at least one of the one or more contextual policies; and responsive to a determination that the object violates at least one of the one or more contextual policies, apply at least one of the one or more vision augmentations to at least one of the plurality of camera devices in the environment.

17. The computer system of claim 15, wherein the processor is further configured to:
determine a plurality of specifications for each of the plurality of camera devices in the environment, wherein the plurality of specifications indicate a type of computer vision capability for each of the plurality of camera devices; and
aggregate the type of computer vision capability for each of the plurality of camera devices in the environment to identify the aggregate computer vision capability of the plurality of camera devices, wherein the aggregate computer vision capability is a total range of computer vision capabilities for any combination of the plurality of camera devices in the environment.

18. The computer system of claim 15, wherein, when the processor is configured to determine a plurality of vision areas in a field of view, the processor is further configured to:
create one or more virtual sections to define the plurality of vision areas in the field of view;
configure the plurality of vision areas in the field of view based, at least in part, on a dimensional length of the one or more virtual sections; and
assign at least one of the plurality of camera devices to each of the plurality of vision areas in the field of view.

19. The computer system of claim 15, wherein, when the processor is configured to determine one or more contextual policies for the plurality of vision areas in the field, the processor is further configured to:
identify a plurality of contextual situations in real-time utilizing the plurality of camera devices in the environment;
select one or more contextual policies based on the plurality of contextual situations, wherein the one or more contextual policies define a type of imaging that is prohibited in each of the plurality of vision areas within the field of view; and
assign at least one of the one or more contextual policies to at least one of the plurality of vision areas in the field of view.

20. The computer system of claim 15, wherein, when the processor is configured to determine the one or more vision augmentations for the plurality of vision areas, the processor is further configured to:
compare the one or more vision augmentations supported by the aggregate computer vision capability of the plurality of camera devices in the environment to the one or more contextual policies assigned to each of the plurality of vision areas in the field of view; and
determine at least one of the one or more vision augmentations supported by the aggregate computer vision capability of the plurality of camera devices that satisfies the one or more contextual policies assigned to each of the plurality of vision areas in the field of view.

* * * * *